May 7, 1963 W. SPARKS 3,088,363
BRAIDING APPARATUS
Filed July 17, 1962 2 Sheets-Sheet 1
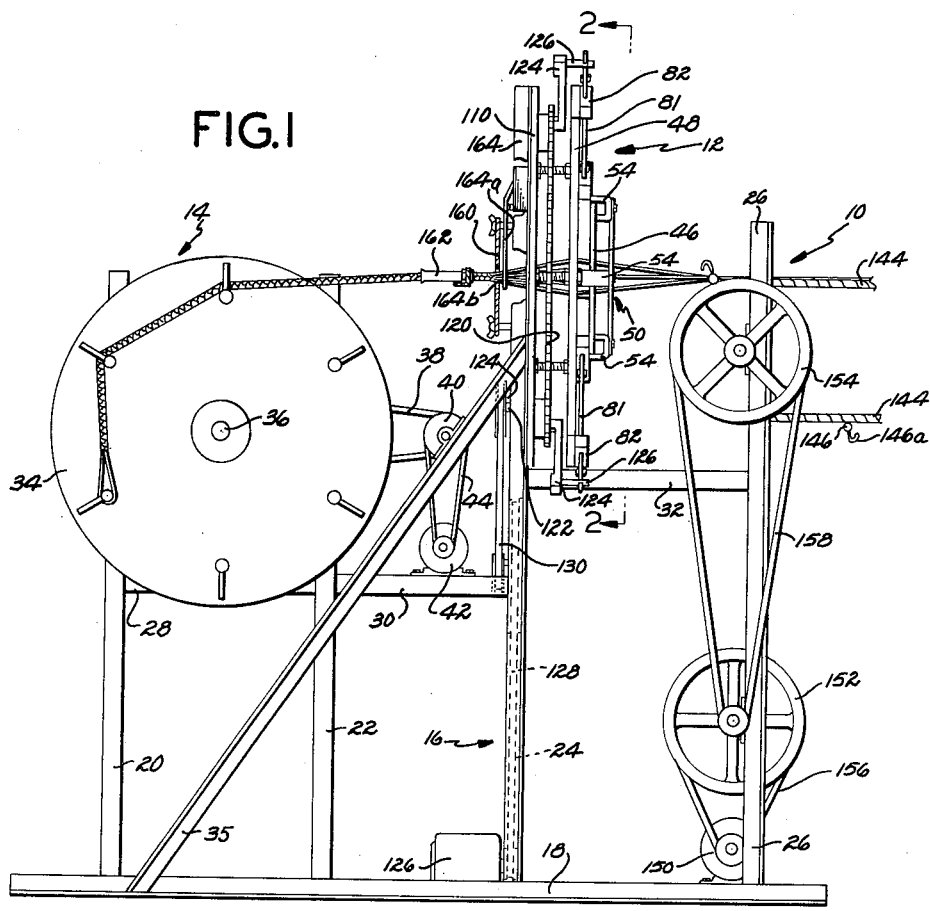
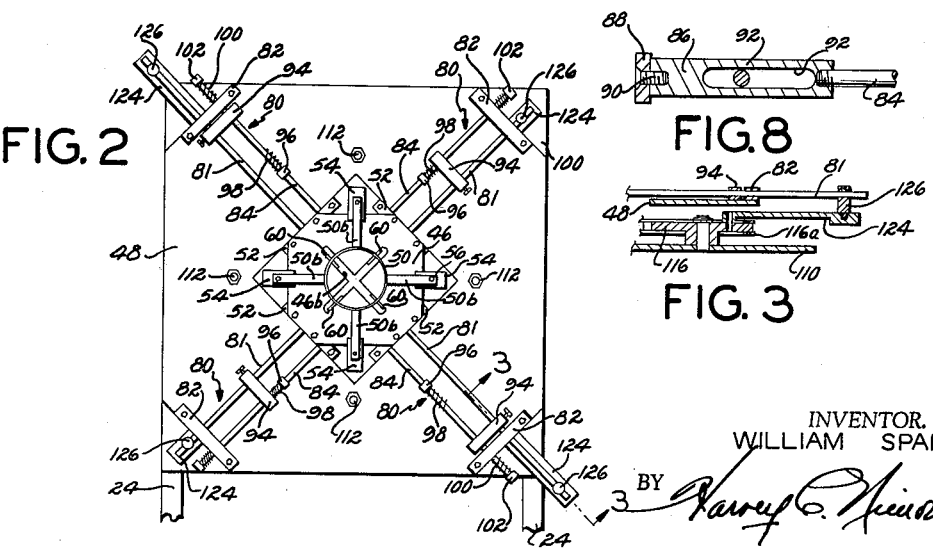
INVENTOR.
WILLIAM SPARKS
BY
ATTORNEY May 7, 1963  W. SPARKS  3,088,363
BRAIDING APPARATUS
Filed July 17, 1962  2 Sheets-Sheet 2
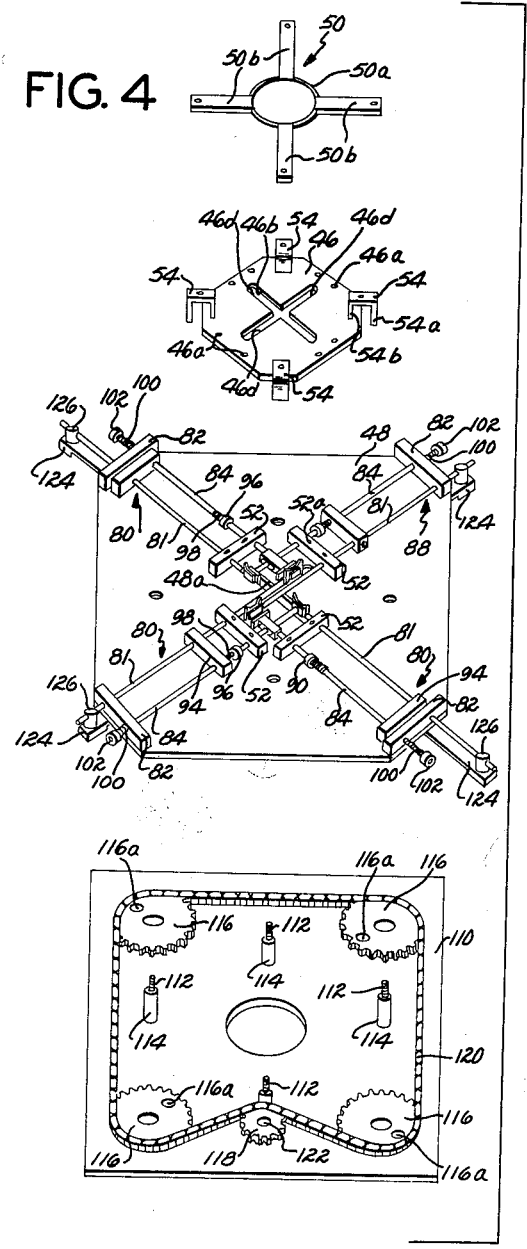
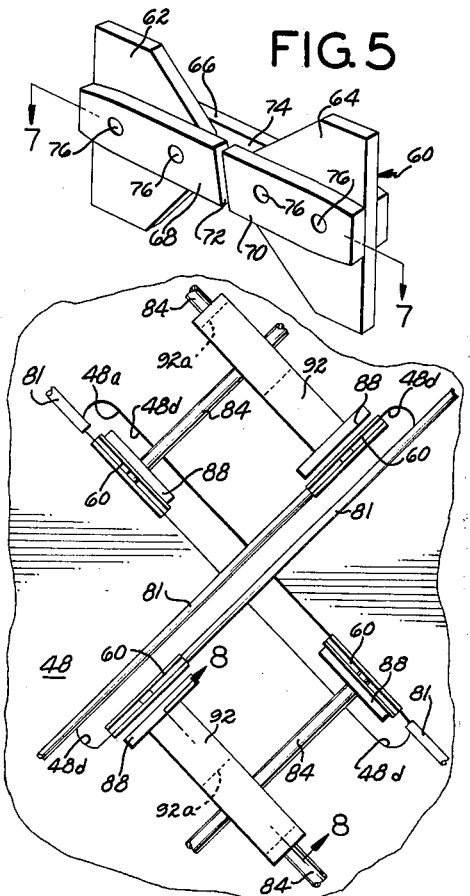
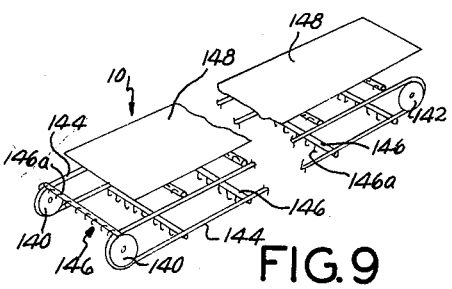
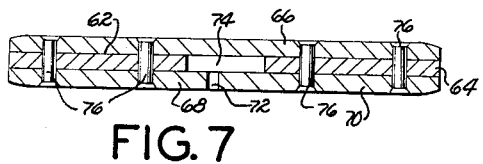
INVENTOR.
WILLIAM SPARKS
BY
ATTORNEY United States Patent Office 3,088,363
Patented May 7, 1963

3,088,363
BRAIDING APPARATUS
William Sparks, 626 Hamilton St., Costa Mesa, Calif.
Filed July 17, 1962, Ser. No. 210,525
17 Claims. (Cl. 87—33)

The present invention relates to braiding apparatus, and more particularly to machines for automatically braiding elongated metallic strands or the like.

In the electrical industry and other similar industries it is often necessary to thread electrical wires or other small objects through conduits having relatively small openings. To facilitate such operation, fish tapes have been provided which are first threaded through the conduit. Thereafter, the wire or other object is fastened to the fish tape so as to be drawn through the conduit merely by removing the fish tape therefrom.

Whereas electrical lead wires and the like normally cannot be pushed or forced into a conduit having certain turns and bends, fish tapes are constructed so as to be flexible for conforming to the turns and bends in the conduit while still being relatively stiff and rigid so as to be capable of being pushed through the conduit from one end thereof. Although different types of fish tapes have heretofore been provided, it has been found that the tape disclosed in my Patent 3,028,146 for Fish Tape is particularly efficient and easy to thread into a small conduit. Such fish tape is constructed of a plurality of strands of wire which are braided together in a predetermined pattern so as to provide flexibility and rigidity for the tape throughout its length.

One form of the invention disclosed in my above noted patent comprises four elongated strands of wires arranged in two pairs. The wires of each pair are interchanged in a given rotational direction, and the several pairs of wires are alternately so interchanged throughout the length of the tape. In this manner, as shown in such patent, the four wires are caused to be aligned at various spaced points along the length of the tape, with adjacent alignments being offset by approximately ninety degrees. Thus, there is provided a fish tape which when inserted into a conduit is engageable therewith at only predetermined spaced points along its length. Also, such arrangement provides a tape which is relatively firm and rigid so as to be easily forced into the conduit.

Although the above described fish tape, which is the subject matter of the above mentioned Patent 3,028,146, can be quickly and efficiently manufactured by the apparatus of the present invention, such apparatus can be employed to braid other types and designs of tape.

An object of the present invention is to provide braiding apparatus for automatically braiding together elongated metallic strands.

Another object of the present invention is to provide braiding apparatus having means for automatically controlling the spacing of the braids throughout the length of the strands.

Another object of this invention is to provide braiding apparatus which employs magnetic means for properly positioning the braiding shuttles.

Another object of the present invention is to provide braiding apparatus as characterized above which includes means for effectively removing the back braid from the wires being braided.

Another object of the present invention is to provide braiding apparatus having braiding shuttles which are held in proper position by magnetic flux, and wherein mechanical means is provided for moving such shuttles in predetermined braiding paths.

Another object of the present invention is to provide braiding apparatus as characterized above wherein the shuttles are magnetically held in proper relation, even throughout relative movement thereof during the braiding operation.

Another object of the present invention is to provide braiding apparatus which is efficient and fast operating so as to quickly and easily provide fish tapes of virtually any desired length.

Another object of the present invention is to provide braiding apparatus as characterized above which is simple and inexpensive to manufacture and which is rugged and dependable in operation.

The novel feature which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

FIGURE 1 is a fragmentary side elevational view of apparatus according to the present invention.

FIGURE 2 is a fragmentary sectional view taken substantially along line 2—2 of FIGURE 1.

FIGURE 3 is a fragmentary sectional view taken substantially along line 3—3 of FIGURE 2.

FIGURE 4 is an exploded perspective view of the shuttle operating mechanism of the device of FIGURE 1.

FIGURE 5 is a perspective view of one of the shuttles.

FIGURE 6 is a fragmentary elevational view of a portion of the shuttle operating means.

FIGURE 7 is a sectional view taken substantially along line 7—7 of FIGURE 5.

FIGURE 8 is a fragmentary sectional view taken substantially along line 8—8 of FIGURE 6 and;

FIGURE 9 is a perspective view of the combing mechanism of the apparatus of FIGURE 1.

Like reference characters indicate corresponding parts throughout the several views of the drawings.

Referring to FIGURE 1 of the drawings, there is shown therein a preferred embodiment for illustration of the present invention. This embodiment comprises generally a combing mechanism 10, a braiding section 12, and a takeup section 14.

The entire apparatus is supported on a frame 16 comprising one or more horizontal members 18 which rest upon a suitable foundation, and a plurality of vertical support members as shown at 20, 22, 24 and 26. The upper ends of such vertical support members are held in fixed relation by suitable horizontal members such as shown at 28, 30 and 32, and one or more diagonal braces 35. As will be readily apparent to those persons skilled in the art, framework 16 can be formed of any suitable structural members such as angle irons or the like which may have L-shaped or U-shaped cross sections in accordance with good engineering practice.

The take-up section 14 of the subject apparatus comprises a take-up reel 34 which is rotatably mounted on frame 16 as by a shaft 36 suitably positioned within a bearing member on frame 16. Shaft 36 carries a pulley (not shown) for rotation by a belt 38. Belt 38, in turn, is operatively associated with a pulley mechanism 40 which is driven by an electric motor 42 through a belt 44. Thus, energization of motor 42 causes take-up reel 34 to rotate at the desired speed.

The braiding section 12 of the subject apparatus comprises a pair of spaced magnetic plates 46 and 48 as shown most clearly in FIGURE 4 of the drawings. Such plates are formed of magnetically permeable material for flow therethrough of magnetic flux as will hereinafter appear.

Positioned adjacent plate 46 in spaced relation thereto is a guide member 50 which comprises a metallic annulus 50a and four radially extending mounting arms 50b. One end of each mounting arm is fastened to annulus 50a as by brazing or the like, and the opposite end is provided with a through opening for mounting of guide member 50 as will hereinafter appear.

Interposed between plates 46 and 48 are four spacer-guide blocks 52. Each such block 52 is formed with a pair of spaced through openings 52a in alignment with correspondingly spaced openings 46a in plate 46 and similar openings in plate 48. Such openings in plate 48 are formed with fastening threads whereby suitable fastenings bolts (not shown) can be positioned in plate 46, spacer 52 and plate 48 to retain the same in fixed assembled relation. For purposes which will hereinafter become more apparent, the spacers 52 and the aforementioned fastening bolts for use therewith should be formed of non-magnetic material such as brass so that the plates 46 and 48 are magnetically independent.

With the plates 46 and 48 in assembled relation, one or more magnets, four of which are shown at 54 in FIGURE 4, are positioned therebetween so as to oppositely magnetically polarize said plates. Each magnet may be a permanent magnet or an electromagnet as will be readily apparent to those persons skilled in the art.

As shown most clearly in FIGURE 4, each magnet 54 of the present embodiment is substantially U-shaped and is provided with an elongated leg 54a and a shortened leg 54b. This construction is desirable to enable the leg 54b to engage or contact the plate 46 while the elongated leg 54a engages the plate 48. Thus, the magnets 54 are caused to straddle the peripheral edge of plate 46. If desired, a suitable spacer of magnetically permeable material can be interposed between the plate 48 and each of the magnets 54 to compensate for the spaced relation of the plates 46 and 48.

Each magnet 54 is held in engagement with plates 46 and 48 by a fastening bolt 56 which extends through the opening in one of the mounting arms 50b of guide member 50 and an appropriate through opening formed in the central or intermediate portion of the magnet. Such bolts are threadedly mounted in plate 48 to urge the magnets into firm seating engagement with both of the plates. Bolts 56 should be formed of non-magnetic material such as brass so as not to interfere with the magnetic potential between plates 46 and 48.

Magnetic plates 46 and 48 are formed with substantially identical aligned through openings as shown at 46b and 48a respectively. Each such opening is formed with elongated apertures which intersect at approximately right angles at their midpoints to provide one continuous opening in each plate formed of a plurality of radially extending cutouts as shown at 46d with respect to plate 46 and at 48d with respect to plate 48. As mentioned above, such openings in plates 46 and 48 are substantially identical and are aligned when the plates 46 and 48 are in assembled relation. Each of the elongated apertures has substantially parallel opposite side walls which provide pathways for the braiding shuttles 60 to be described.

Each shuttle 60 comprises a pair of V-shaped magnetic members 62 and 64 held in spaced relation by a connecting member 66 on one side thereof. Fixed to the other side of members 62 and 64 are a pair of positioning members 68 and 70 in spaced relation to provide a threading space 72 therebetween. The positioning of magnetic members 62 and 64 in spaced relation provides a space 74 therebetween for retaining a strand of wire to be braided as will hereinafter be explained in detail. Each shuttle 60 is held in assembled condition as shown in FIGURE 5 by suitable rivets 76.

As shown most clearly in FIGURE 6, the subject braiding apparatus comprises a shuttle 60 for each of the radially extending cutouts 46d and 48d in plates 46 and 48. Each shuttle is positioned against the side walls of a pair of aligned cutouts 46d and 48d of the plates 46 and 48. That is, each such shuttle is positioned so that the magnetic members 62 and 64 thereof extend between the plates 46 and 48 with the opposite ends of such magnetic members in engagement with the adjacent side walls of the particular cutouts. The connecting member 66 on one side, and the members 68 and 70 on the other side of shuttle 60 then loosely fit between the plates to act as guides for maintaining the shuttle in proper orientation as the shuttle moves along the side walls of the particular apertures.

Due to the fact that the magnetic plates 46 and 48 are oppositely magnetically polarized by the magnets 54 as above described, such shuttles 60 are magnetically retained in engagement with such plates as a result of magnetic flux flow through the corresponding magnetic members 62 and 64. Such magnetic attraction persists throughout movement of such shuttles, the aforementioned guide members assisting in maintaining the shuttles in proper position.

For moving said shuttles in predetermined braiding paths, there is provided between plates 46 and 48 a shuttle actuating means 80 for each shuttle. Each actuating means 80 includes a rectilinearly movable actuating rod 81 for moving the respective shuttle along a pair of aligned side walls of the corresponding apertures. Each actuating rod 81 is maintained in proper relation to the particular side walls of the corresponding apertures by one of the aforementioned guide members 52 and a guide member 82 fixed to plate 48. The corresponding guide members 52 and 82 are provided with aligned openings for slidably receiving the actuating rod 81.

Each pair of guide members 52 and 82 is provided with additional aligned openings for receiving a shuttle transfer rod 84 in substantially parallel relation to the respective actuating rod 81. It should be noted, however, that whereas certain of the actuating mechanisms have the transfer rod 84 on one side of the actuating rod 81, the other actuating mechanisms have the rod 84 on the other side of the shuttle actuating rod 81. This difference, as will hereinafter become more apparent, is due to the fact that whereas two of the oppositely disposed strands of wire are interchanged in a clockwise direction, the other strands of wire are interchanged in a counter-clockwise direction.

Each transfer rod carries a transfer shoe 90 at one end thereof. However, since all of the rods operate in the same plane, certain of the transfer rods 84 are provided with connecting blocks 92 between the end of the rod and the transfer shoe attached thereto to facilitate the abovementioned reverse braiding motion as will hereinafter be explained in detail. Each block 92 is formed with an elongated slot or cutout 92a through which extends the transfer rod 84 of the adjacent actuating mechansim. Thus, as most clearly shown in FIGURE 8 of the drawings, each shuttle transfer rod 84 can be actuated independently even though they all operate in the same general plane between the plates 46 and 48.

The driving means for the transfer rods 84 comprises a drive member 94 which is adjustably fixed to the respective shuttle actuating rod 81 and is formed with a through opening for loosely receiving the transfer rod. Adjustably attached to each transfer rod 84 is a collar 96, there being a compression spring 98 on the transfer rod in abutting engagement with the collar 96. Thus, as will hereinafter appear in greater detail, as each shuttle actuating rod 81 is moved toward the center of plate 48, the corresponding drive member 94 is moved therewith so as to eventually engage the respective compression spring 98. Thereafter, further movement of the actuating rod 81 causes the transfer rod 84 to be moved in the same general direction through the action of the spring 98 on the collar 96.

For returning each transfer rod 84 to its original position after the corresponding shuttle actuating rod 81 has been returned to its retracted position, there is provided a compression spring 100 near the end of each transfer rod and a nut 102 fastened to the end thereof to hold the particular spring 100 in engagement with the corresponding guide block 82. Thus, as each drive member 94 releases the respective rod 84 by virtue of disengagement with the compression spring 98, the compression spring 100 causing the transfer rod to be returned to its original retracted position.

As shown most clearly in FIGURE 1 of the drawings, there is provided on frame 16 a stationary plate 110 to which the magnetic plate 48 is attached. Plate 110 is shown in FIGURE 4, as are fastening studs 112 and spacers 114 for mounting plate 48 in spaced relation to plate 110.

Mounted on stationary plate 110 is the drive means for the aforedescribed shuttle actuating mechanisms 80. Such drive means comprises four drive gears 116 and a drive pinion 118 all of which are drivingly interconnected by an endless chain 120 as shown in FIGURE 4. Pinion 118 is mounted on a drive shaft 122 which, as shown in FIGURE 1, carries a connecting rod 124. This pulley is driven by a motor 126 at the base of frame 16 through appropriate pulleys and belts 128 and 130. Thus, upon energization of electric motor 126, the shaft 122 is caused to rotate at the proper speed so as to cause pinion 118 to rotate the drive gears 116 in the proper direction at the proper speed.

As most clearly shown in FIGURE 3 of the drawings, each drive gear 116 is rotatably mounted on plate 110 adjacent one of the shuttle actuating mechanisms 80. Each such gear member carries a connecting rod 124, one end of which is rotatably mounted on the drive gear offset from the axis of rotation thereof. The other end of each rod 124 is connected to the respective shuttle actuating rod 81 through a connecting pin 126 which permits of rotatable movement between the connecting rod and the actuating rod. Thus, as the drive gears 116 are rotated under the influence of motor 126, the shuttle actuating rods 81 are caused to move in a rectilinear manner.

As shown most clearly in FIGURE 9 of the drawings, the combing apparatus 10 for removing the back braid from the strands of wire being braided comprises a pair of forward pulleys 140 and a pair of rearward pulleys 142. Suitable drive means such as nylon cord or the like is formed into endless belts 144 for operation on either side of the combing apparatus in cooperation with the corresponding forward and rearward pulleys. Extending between the endless cords 144 are combing devices 146 in spaced relation therealong, each of which is formed with a plurality of spaced combing teeth 146a for operation between the strands of wire as will hereinafter appear. On top of the combing apparatus 10 is a blanket 148 formed of suitable heavy material such as canvas for preventing the ends of the strands of wire from injuring the operator of the apparatus as the strands of wire are being combed free of the back braid.

The endless cores 144 are driven by an electric motor 150 through suitable pulleys 152 and 154 and drive belts 156 and 158. Pulley 154 is mounted on the same shaft which carries the forward pulleys 140 of the combing apparatus 10.

As shown most clearly in FIGURE 1, there is provided on plate 110, a guide member 160 which is formed with a central opening through which the braided strands of wire pass when being wound onto the take-up reel 34. Immediately in front of guide member 160 is a tubular member 162 which operates to tighten the braids of the strands as they leave the braiding section 12.

Also positioned on plate 110 is a circuit controlling device 164 which comprises a pair of relatively movable switch contacts connected in the energizing circuit for motor 42. Switch 164 further comprises an actuator 164a which is formed with an annular end portion 164b through which the strands of wire pass after being braided. Such annular end portion is of predetermined size to control the energizing circuit for motor 42 through the operation of switch 164 in accordance with the number of braids provided per unit length of the strands of wire. The electrical contacts of switch 164 are normally closed to permit energization of motor 42. However, upon movement of actuator 164a against the force of suitable biasing means therefrom such contacts are moved to open circuit condition to thereby open the energizing circuit for motor 42.

The apparatus shown in the drawings operates generally as follows:

Initially, the four strands of wire to be braided are positioned on the combing apparatus 10 in side by side spaced relation. In this regard, it is contemplated that strands considerably longer than the length of the combing apparatus can be braided on the subject machine, such strands being laid across the top of the apparatus and bent around the rear thereof to be supported by the combing elements 146a on the underside of the apparatus. For this purpose, the combing elements 146a are provided with a generally U-shape for supporting the portion of the strands on the underside of the apparatus.

With the strands of wire so positioned on the combing apparatus, the next step is to insert the wires through the annular guide member 50 and the elongated openings 46b and 48a in magnetic plates 46 and 48 respectively. Such strands of wire are individually positioned in the braiding shuttles 60 merely by being inserted through the threading space 72 between the members 68 and 70. In this manner, each strand is positioned within the space 74 between the spaced magnetic numbers 62 and 64. It may be found desirable to provide resilient latching means for the threading space 72 of each shuttle to enable the strand of wire to be inserted into the space 74 and to prevent removal therefrom. In this regard, it has been found desirable to employ a piece of shim stock across each threading slot.

The strands of wire are then passed through the opening in plate 110 and the annular end portion 164b of actuator 164a of switch 164. Thereafter, the strands pass through the opening in guide plate 160 and the tubular member 162.

The forward end of the strands of wire are fastened to a metallic hook or loop for attachment to take-up reel 34 and to provide means for attaching the resulting fish tape to lead wires and the like to be drawn through a conduit. Take-up reel 34 is provided with appropriate radially positioned horizontal pegs onto which the fish tape is wound as it is braided by the subject apparatus. In this regard, reel 34 could be constructed in the form of a drum onto which the tape could be wound.

After the strands of wire have been so threaded in the subject apparatus, the motors 42, 126, and 150 are energized to place the apparatus in operation.

Energization of motor 42, of course, causes take-up reel 34 to rotate in a counterclockwise direction as viewed in FIGURE 1 so as to take-up the strands of wire after they are braided together.

In synchronism with the rotation of reel 34, motor 126 causes the shuttles 60 to be moved in predetermined braiding paths. The output of motor 126 is transmitted to endless chain 120 through drive belts 128 and 130, shaft 122 and pinion 118. Rotation of pinion 118, of course, causes endless chain 120 to simultaneously rotate the four drive gears 116.

As shown most clearly in FIGURE 3 of the drawings, rotation of each drive gear causes the corresponding connecting rod 124 to move the associated shuttle actuating rod 81 back and forth on plate 48. The forward motion of such rod engages the respective braiding shuttle and pushes it along the relatively straight side wall of the particular elongated apertures in the plates 46 and 48.

As shown most clearly in FIGURE 4, the oppositely disposed rods 81 are simultaneously moved toward the center of the openings in the plates 46 and 48 while the other oppositely disposed rods 81 are being retracted to their initial positions. This relationship is shown most clearly by the openings 116a in the gear members 116 wherein the connecting rods 124 are connected to the respective gear members. That is, with the openings 116a in their outermost positions as shown with respect to the upper left-hand and lower right-hand gears 116 in FIGURE 4, the associated connecting rods 124 position the corresponding actuating rods 81 in retracted position as also shown in FIGURE 4. Conversely, the other gear members 116 are shown with their mounting holes 116a located toward the center of the plate 110. As such, these latter gear members position the corresponding actuating rods 81 in their extreme actuating positions as shown in said FIGURE 4.

Thus, as shown in FIGURE 6, the upper left-hand and lower right-hand rods 81 are about to interchange the respective braiding shuttles 60 in a counterclockwise direction as the rods 81 for the other shuttles are about to be retracted. Thus, only one pair of braiding shuttles is operated at a given time, the other shuttles being inoperative to interchange their strands of wire.

As the shuttle actuating rods 81 are moved forward for interchanging the shuttles, the respective transfer rods are also carried forward as a result of the movement of the corresponding drive members 94 and the associated compression springs 98 and collars 96. As shown most clearly in FIGURE 6 of the drawings, such forward motion of the rods 84 transfers the idle braiding shuttles 60 to the opposite sides of their elongated apertures. That is, as shown in said FIGURE 6, as the shuttles 60 are being interchanged in a clockwise direction in the elongated aperture which extends from the lower left-hand corner to the upper right-hand corner of that view, the lower right-hand shuttle 60 is being moved to the upper right-hand surface of its apertures while the upper left-hand shuttle 60 is being moved to the lower left hand surface of said elongated apertures. Thus, during the idle period for each pair of shuttles, they are pushed to the opposite side walls, the magnetic force thereon being momentarily interrupted. Such transferring, of course, enables each pair of shuttles to follow a closed path or loop in a given direction of rotation.

It should be particularly noted that whereas one pair of shuttles rotates in a clockwise direction, the other pair rotates in a counterclockwise direction. This, as is explained in detail in my above noted patent application for fish tape, provides a tape having the desired rigidity and stiffness due to the fact that the braids are alternately formed in opposite rotational directions. This means, of course, that such tape does not act as a coiled or helical spring but rather as a single strand.

The aforedescribed operation continues with first one pair of shuttles being interchanged in one rotational direction and thereafter the other pair of shuttles being interchanged in the opposite rotational direction. As such braids pass through tube 162 after leaving braiding section 12, they are tightened so as to provide the desired fish tape.

As will be readily appreciated by those persons skilled in the art, the number of braids per unit length provided in the fish tape is dependent upon the relative speeds of operation of the take-up reel 34 and the actuating mechanisms 80 for the shuttles 60. In the event the motor 42 is operating too fast as compared to the speed of operation of motor 126, the braids will tend to occur less frequently along the length of the strands and hence the point of convergence of the strands after leaving the braiding section 12 will tend to move to the left as viewed in FIGURE 1. If this should occur, the strands of wire will engage the annular end portion 164b of such actuator so as to move it to the left to cause switch 164 to momentarily interrupt energization of motor 42. Thus, the braiding operation of the shuttles 60 will be given a chance to catch up to the speed of the take-up reel 34 to again provide the desired number of braids per unit length of the strands of wire.

Throughout the aforedescribed operation of the braiding section 12 and the take-up reel 34, the motor 150 is rotating pulley 154 in a clockwise direction as viewed in FIGURE 1. This causes the pulleys 140 and 142 to rotate in a clockwise direction as viewed in FIGURE 9, thereby causing the combing devices 146 to move from left to right along the upper portion of the combing apparatus. Thus, the combing teeth or elements 146a move in the direction opposite to the direction of movement of the strands of wire through the braiding apparatus. As such, the combing teeth move the back braids toward the rearward end of the strands of wire so that they are fed into the braiding section 12 in the desired spaced relation. Such back braid necessarily results from the fact that the wires are being braided intermediate their lengths. Thus, every braiding operation provides both a front and a back braid.

As the back braids are being combed out of the strands of wire, the rearward end portions thereof tend to be thrown about in a random pattern. This is very dangerous to personnel near the apparatus. In view of this, the heavy canvas 148 is permitted to rest on top of the combing apparatus to confine the rearward end portions of the strands of wire.

It is thus seen that the present invention provides braiding apparatus which is capable of automatically braiding elongated strands formed of substantially any type of material. Also, such machine is capable of providing braids of substantially any type of style. Such braiding apparatus is particularly well suited for use in braiding all types of fish tapes.

Although I have shown and described certain specific embodiments of my invention, I am fully aware that many modifications thereof are possible. My invention, therefore, is not to be restricted except in so far as is necessitated by the prior art and by the spirit of the appended claims.

I claim:

1. In a machine for braiding strands of elongated flexible material, the combination of, a pair of spaced magnetic plates of opposite magnetic polarity, a pair of relatively movable braiding shuttles adapted to receive said strands and formed of magnetically permeable material to be held between said plates by magnetic flux flow therethrough, and means for simultaneously moving said shuttles in predetermined braiding paths between said plates to thereby braid said strands of flexible material.

2. In a machine for braiding strands of elongated flexible material, the combination of, a pair of speed magnetically permeable plates, at least one magnet operatively interposed between said plates to provide the same with opposite magnetic polarity, a pair of relatively movable braiding shuttles adapted to receive said strands and formed of magnetically permeable material to be held between said plates by magnetic flux flow therethrough, and means for simultaneously moving said shuttles in predetermined braiding paths between said plates to therby braid said strands of flexible material.

3. In a machine for braiding strands of elongated flexible material, the combination of, a pair of spaced magnetic plates of opposite magnetic polarity having aligned substantially identical pathways, a pair of relatively movable braiding shuttles adapted to receive said strands and formed of magnetically permeable material, each of said shuttles being positioned in said pathways to extend between said plates to be held therebetween by magnetic flux flow therethrough, and means for simultaneously moving said shuttles in said pathways to thereby braid said strands of flexible material.

4. In a machine for braiding strands of elongated flexible material, the combination of, a pair of spaced magnetic plates of opposite magnetic polarity, a pair of relatively movable braiding shuttles adapted to receive said strands and formed of magnetically permeable material to be held between said plates by magnetic flux flow therethrough, means for simultaneously moving said shuttles in predetermined braiding paths between said plates, and means for moving said strands through said shuttles during movement of the latter in said braiding paths to thereby continuously braid said flexible material.

5. In a machine for braiding strands of elongated flexible material, the combination of, a pair of spaced magnetic plates of opposite magnetic polarity, a pair of relatively movable braiding shuttles adapted to receive said strands and formed of magnetically permeable material to be held between said plates by magnetic flux flow therethrough, means for simultaneously moving said shuttles in predetermined braiding paths between said plates, motor operated means for moving said strands through said shuttles during movement of the latter in said braiding paths to thereby continuously braid said flexible material, and control means for said motor operated means to control the movement of said strands through said shuttles in accordance with the movement of said shuttles to provide a predetermined number of braids per unit length of said strands.

6. In a machine for braiding strands of elongated flexible material, the combination according to claim 5 wherein said control means comprises switch means in the energizing circuit of the motor of said motor operated means, and an actuator for said switch means for sensing the spacing between braids on said strands to interrupt the energization of said motor.

7. In a machine for braiding strands of elongated flexible material, the combination of, a pair of spaced magnetic plates of opposite magnetic polarity, a pair of relatively movable braiding shuttles adapted to receive said strands and formed of magnetically permeable material to be held between said plates by magnetic flux flow therethrough, means for simultaneously moving said shuttles in predetermined braiding paths between said plates, means for moving said strands through said shuttles during movement of the latter in said braiding paths to thereby continuously braid said flexible material, and combing apparatus operable on said strands to remove the back braid therein caused by operation of said shuttles.

8. In a machine for braiding strands of elongated flexible material, the combination of, a pair of spaced magnetic plates of opposite magnetic polarity, a pair of relatively movable braiding shuttles adapted to receive said strands and formed of magnetically permeable material to be held between said plates by magnetic flux flow therethrough, means for simultaneously moving said shuttles in predetermined braiding paths between said plates, means for moving said strands through said shuttles during movement of the latter in said braiding paths to thereby continuously braid said flexible material, and combing apparatus comprising a combing member operable on portions of said strands prior to reaching said shuttles to comb out back braid caused by operation of said shuttles intermediate the length of said strands.

9. In a machine for braiding strands of elongated flexible material, the combination according to claim 8 wherein said combing apparatus comprises drive means for moving said combing member in the direction opposite to the movement of said strands through said shuttles.

10. Braiding apparatus comprising in combination, a pair of spaced magnetic plates formed with aligned elongated through openings, a pair of relatively movable braiding shuttles each of which is formed of magnetically permeable material engageable with said plates within said openings to thereby bridge the space between said plates, at least one magnet operatively interposed between said plates to magnetically polarize said plates to thereby tending through said openings and individually engageable with said plates, a pair of elongated flexible strands extending through said openings and individually engageable with said shuttles, means for effecting simultaneous movement of said strands through said shuttles, and means for simultaneously moving said shuttles in a circuitous path within said openings in said plates, whereby said shuttles are magnetically held in engagement with said plates throughout braiding of said strands.

11. Braiding apparatus comprising in combination, a pair of spaced magnetic plates formed with aligned elongated through openings each of which has substantially parallel side walls, a pair of relatively movable braiding shuttles each of which is formed of magnetically permeable material engagement with both said plates within said openings therein to thereby bridge the space between said plates, said shuttles being arranged on opposite side walls of said openings, at least one magnet operatively interposed between said plates to magnetically polarize said plates to thereby cause said shuttles to be magnetically held in engagement with said plates, a pair of elongated flexible strands extending through said openings and individually engageable with said shuttles, means for effecting simultaneous movement of said strands through said shuttles, and means for simultaneously moving said shuttles in opposite directions on said side walls of said openings to thereby interchange said strands to provide a braid therein.

12. Braiding apparatus comprising in combination, a pair of spaced magnetic plates formed with aligned through openings, four relatively movable braiding shuttles each of which is formed of magnetically permeable material engageable with said plates within said openings to thereby bridge the space between said plates, at least one magnet operatively interposed between said plates to magnetically polarize said plates to thereby cause said shuttles to be magnetically held in engagement with said plates, four elongated flexible strands extending through said openings and individually engageable with said shuttles, means for effecting simultaneous movement of said strands through said shuttles, and means for simultaneously moving said shuttles in circuitous paths within said openings in said plates, whereby said shuttles are magnetically held in engagement with said plates substantially throughout the braiding of said strands.

13. Braiding apparatus according to claim 12 wherein each of said through openings in said plates comprises a pair of substantially identical elongated apertures which intersect at substantially right angles at their midpoints and have substantially parallel opposite side walls, each of said shuttles being in engagement with a separate one of said sidewalls of each said openings, and wherein the shuttles in each aperture are simultaneously moved in opposite directions along their side walls in predetermined sequence with the shuttles in the other aperture to provide braids in said strands throughout the lengths thereof.

14. Braiding apparatus according to claim 13 wherein said means for simultaneously moving said shuttles in opposite directions comprises means for simultaneously moving the shuttles in each aperture to the opposite side walls thereof, and means thereafter operable to move said shuttles in opposite directions on said other side walls whereby the shuttles of each aperture follow a closed path in a given rotational direction.

15. Braiding apparatus according to claim 14 wherein said means for moving said shuttles causes the shuttles of one of said apertures to rotate in a clockwise closed path and the shuttles of the other of said apertures to rotate in a counterclockwise closed path.

16. Braiding apparatus according to claim 15 wherein said means for moving said shuttles is operable to alternately move the shuttles of said apertures to provide braids of alternate ones of said strands throughout the lengths thereof.

17. Braiding apparatus comprising in combination, a pair of spaced magnetic plates formed with aligned substantially identical openings having at least two pairs of oppositely disposed cutouts all of which open to a common point, magnetic means operatively interposed between said plates to magnetically polarize said plates, a braiding shuttle for each of said cutouts to receive a flexible strand and formed of magnetically permeable material engaging both of said plates in said openings to be magnetically held therebetween, an elongated flexible strand in each of said shuttles extending through said openings in said plates, means for effecting continuous movement of said strands through said shuttles, and means for simultaneously moving the shuttles in each pair of oppositely disposed cutouts, said pairs of shuttles being moved in predetermined sequence to effect braiding of said flexible strands.

References Cited in the file of this patent

UNITED STATES PATENTS 1,187,211     Webb ---------------- June 13, 1916

FOREIGN PATENTS 1,022,457     France ------------------ Dec. 17, 1952
788,023     Great Britain ----------- Dec. 18, 1957